United States Patent
Meier et al.

(10) Patent No.: US 6,704,854 B1
(45) Date of Patent: Mar. 9, 2004

(54) DETERMINATION OF EXECUTION RESOURCE ALLOCATION BASED ON CONCURRENTLY EXECUTABLE MISALIGNED MEMORY OPERATIONS

(75) Inventors: Stephan G. Meier, Sunnyvale, CA (US); James B. Keller, Palo Alto, CA (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 0 days.

(21) Appl. No.: 09/433,185

(22) Filed: Oct. 25, 1999

(51) Int. Cl.[7] .................................................. G06F 9/30
(52) U.S. Cl. ........................ 712/204; 712/210; 712/216
(58) Field of Search ................................ 712/704, 225, 712/210, 216, 217; 711/201; 710/5

(56) References Cited

U.S. PATENT DOCUMENTS

| | | | | |
|---|---|---|---|---|
| 5,517,657 A | * | 5/1996 | Rodgers et al. | 711/169 |
| 5,519,842 A | * | 5/1996 | Atallah et al. | 711/147 |
| 5,557,768 A | * | 9/1996 | Braceras et al. | 711/108 |
| 5,561,781 A | * | 10/1996 | Braceras et al. | 712/218 |
| 5,832,297 A | | 11/1998 | Ramagopal et al. | |
| 5,854,914 A | * | 12/1998 | Bodas et al. | 712/200 |
| 5,898,854 A | * | 4/1999 | Abramson et al. | 711/135 |
| 6,009,510 A | * | 12/1999 | Henry et al. | 712/204 |
| 6,061,779 A | * | 5/2000 | Garde | 712/204 |
| 6,112,297 A | * | 8/2000 | Ray et al. | 711/201 |
| 6,128,721 A | * | 10/2000 | Yung et al. | 712/23 |
| 6,289,420 B1 | * | 9/2001 | Cypher | 712/10 |

OTHER PUBLICATIONS

Yim et al. "Single Cycle Access Cache for the Misaligned Data and Instruction Prefetch", IEEE, 1997, pp. 677–678.*

* cited by examiner

Primary Examiner—Kakali Chaki
Assistant Examiner—William H. Wood
(74) Attorney, Agent, or Firm—Lawrence J. Merkel; Meyertons, Hood, Kivlin, Kowert & Goetzel, P.C.

(57) ABSTRACT

A processor includes execution resources for handling a first memory operation and a concurrent second memory operation. If one of the memory operations is misaligned, the processor may allocate the execution resources for the other memory operation to that memory operation. In one embodiment, the older memory operation proceeds if misalignment is detected. The younger memory operation is retried and may be reexecuted at a later time. If the older memory operation is misaligned, the execution resources provided for the younger operation may be allocated to the older memory operation. If only the younger memory operation is misaligned, the younger memory operation may be the older memory operation during a subsequent reexecution and may thus be allocated the execution resources to allow the memory operation to complete.

31 Claims, 6 Drawing Sheets

DETERMINATION OF EXECUTION RESOURCE ALLOCATION BASED ON CONCURRENTLY EXECUTABLE MISALIGNED MEMORY OPERATIONS

BACKGROUND OF THE INVENTION

1. Field of the Invention

This invention is related to the field of processors and, more particularly, to mechanisms for handling misalignment of load/store memory operations in processors.

2. Description of the Related Art

Processors generally include support for memory operations to facilitate transfer of data between the processors and memory to which the processors may be coupled. As used herein, a memory operation is an operation specifying a transfer of data between a processor and a main memory (although the transfer may be completed in cache). Load memory operations specify a transfer of data from memory to the processor, and store memory operations specify a transfer of data from the processor to memory. Memory operations may be an implicit part of an instruction which includes a memory operation, or may be explicit load/store instructions. Load memory operations may be more succinctly referred to herein as "loads". Similarly, store memory operations may be more succinctly referred to as "stores".

A given memory operation may specify the transfer of multiple bytes beginning at a memory address calculated during execution of the memory operation. For example, 16 bit (2 byte), 32 bit (4 byte), and 64 bit (8 byte) transfers are common in addition to an 8 bit (1 byte) transfer. The address may be calculated by adding one or more address operands specified by the memory operation to generate a virtual address, which may be translated through an address translation mechanism to a physical address of a memory location within the memory. Typically, the address may identify any byte as the first byte to be transferred, and the additional bytes of the multiple byte transfer are contiguous to the first byte.

Unfortunately, since any byte may be identified as the first byte, a given memory operation may be misaligned. At an architectural level, a memory operation having an address A and accessing N bytes may be defined to be misaligned if A mod N is not equal to zero. However, a particular processor may define misalignment more loosely. Generally, a particular processor may define a memory operation to be misaligned if the memory operation requires additional execution resources (as compared to an aligned memory operation) to complete the access to the N bytes operated upon by the memory operation. For example, a processor may implement a cache having cache lines. If one or more of the N bytes operated upon by the memory operation are in one cache line and the remaining N bytes are in another cache line, two cache lines are accessed to complete the memory operation as opposed to one cache line if the N bytes are included within one cache line. Such an implementation may define misalignment to mean that a cache line boundary is crossed by the N bytes (one or more of the N bytes are on one side of the cache line boundary, and the remaining N bytes are on the other side of the cache line boundary). Other implementations may employ multiple banks within the cache, and each cache line may be spread out among the banks. Such an implementation may define misalignment to mean that a bank boundary is crossed by the N bytes. Other implementations may define misalignment differently.

As indicated above, misaligned memory operations may require more execution resources to complete than aligned memory operations require. However, the misaligned memory operations must be executed correctly to comply with the instruction set architecture of the processor. Accordingly, a mechanism for handling misaligned memory operations is desired.

It is noted that loads, stores, and other instructions or instruction operations may be referred to herein as being older-or younger than other instructions or instruction operations. A first instruction is older than a second instruction if the first instruction precedes the second instruction in program order (i.e. the order of the instructions in the program being executed). A first instruction is younger than a second instruction if the first instruction is subsequent to the second instruction in program order. Additionally, the term "execution resource" generally refers to a piece of hardware used during the execution of an instruction. If one instruction is using an execution resource, another instruction is precluded from concurrent use of that execution resource.

SUMMARY OF THE INVENTION.

The problems outlined above are in large part solved by a processor as described herein. The processor includes execution resources for handling a first memory operation and a concurrent second memory operation. If one of the memory operations is misaligned, the processor may allocate the execution resources for the other memory operation to that memory operation. Advantageously, additional execution resources for handling misalignment may be eliminated. Instead, a small amount of hardware may be included to detect the misalignment and allocate the execution resources for the other memory operation. Additionally, in one embodiment, the power consumed when executing misaligned memory operations may be substantially the same as executing non-misaligned memory operations since additional execution resources are not added to support misaligned memory operations. For example, additional cache reads may not be performed if the execution resources to be allocated include a cache port.

In one embodiment, the older memory operation proceeds if misalignment is detected. The younger memory operation is retried and may be reexecuted at a later time. If the older memory operation is misaligned, the execution resources provided for the younger operation may be allocated to the older memory operation. If only the younger memory operation is misaligned, the younger memory operation may be the older memory operation during a subsequent reexecution and may thus be allocated the execution resources to allow the memory operation to complete.

Broadly speaking, a processor is contemplated. The processor includes a first address generation unit (AGU) and a misalignment circuit. The first AGU is configured to generate a first misalign signal indicative of whether or not a first memory operation is misaligned. Coupled to receive the first misalign signal, the misalignment circuit is configured to allocate at least one execution resource corresponding to a second memory operation concurrently executable with the first memory operation to the first memory operation in response to the first misalign signal. Additionally, a computer system is contemplated including the processor and an input/output (I/O) device configured to communicate between the computer system and another computer system to which the I/O device is couplable.

Furthermore, a method is contemplated. A first memory operation is executed, wherein the execution includes determining that the first memory operation is misaligned. At least one execution resource corresponding to a second memory operation is allocated to the first memory operation responsive to determining that the first memory operation is misaligned. The second memory operation is concurrently executable with the first memory operation.

Moreover, a processor is contemplated. The processor comprises a first AGU, a second AGU, and a misalignment circuit. The first address AGU is configured to generate a first misalign signal indicative of whether or not a first memory operation is misaligned. Similarly, the second AGU is configured to generate a second misalign signal indicative of whether or not a second memory operation is misaligned. Coupled to receive the first misalign signal and the second misalign signal, the misalignment circuit is configured to signal a retry of one of the first memory operation and the second memory operation in response to at least one of the first misalign signal and the second misalign signal indicating misaligned.

BRIEF DESCRIPTION OF THE DRAWINGS

Other objects and advantages of the invention will become apparent upon reading the following detailed description and upon reference to the accompanying drawings in which.

Figure 1:
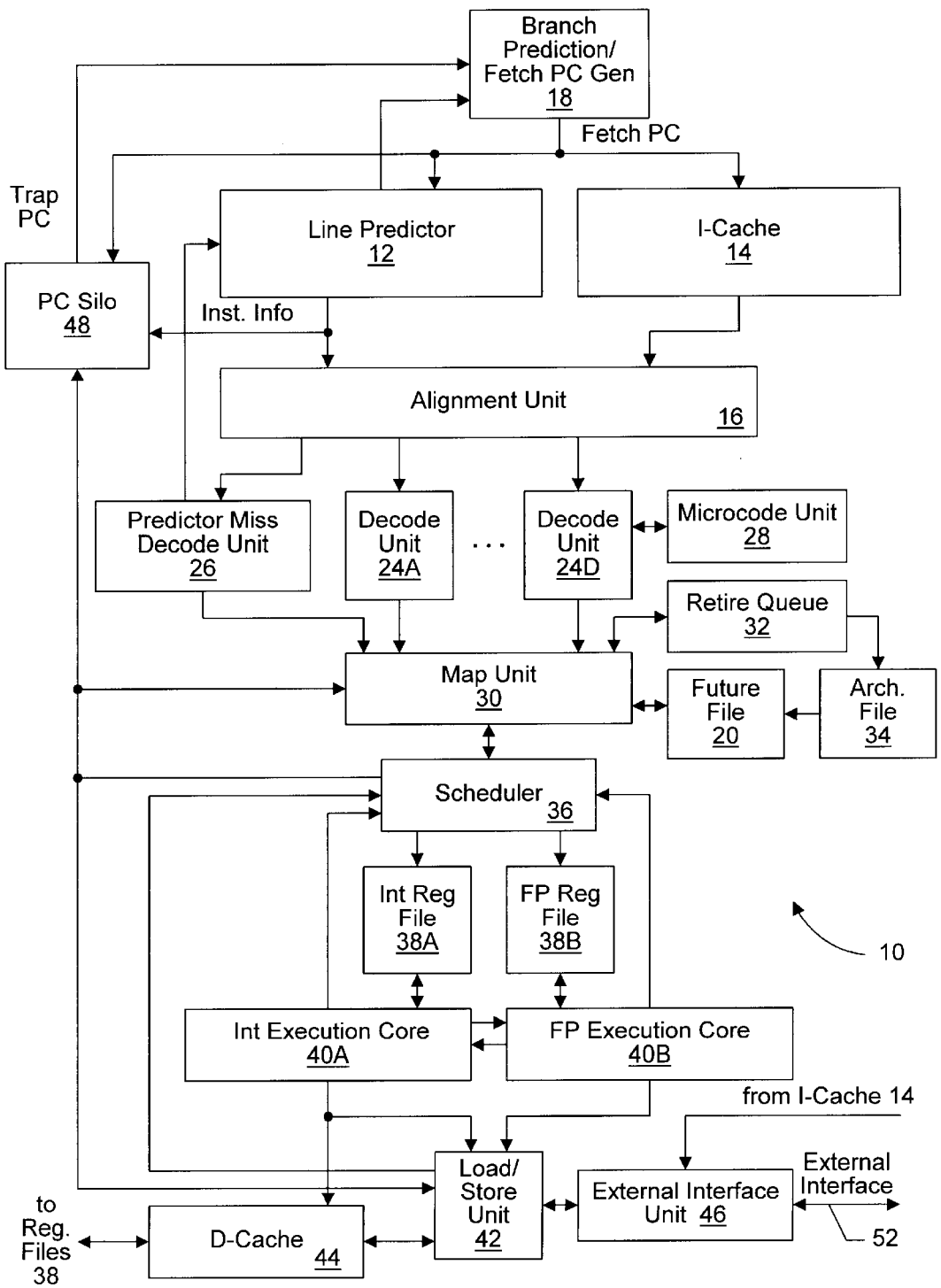
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Processor Overview

Turning now to FIG. 1, a block diagram of one embodiment of a processor 10 is shown. Other embodiments are possible and contemplated. In the embodiment of FIG. 1, processor 10 includes a line predictor 12, an instruction cache (I-cache) 14, an alignment unit 16, a branch prediction/fetch PC generation unit 18, a plurality of decode units 24A–24D, a predictor miss decode unit 26, a microcode unit 28, a map unit 30, a retire queue 32, an architectural renames file 34, a future file 20, a scheduler 36, an integer register file 38A, a floating point register file 38B, an integer execution core 40A, a floating point execution core 40B, a load/store unit 42, a data cache (D-cache) 44, an external interface unit 46, and a PC silo 48. Line predictor 12 is coupled to predictor miss decode unit 26, branch prediction/fetch PC generation unit 18, PC silo 48, and alignment unit 16. Line predictor 12 may also be coupled to I-cache 14. I-cache 14 is coupled to alignment unit 16 and branch prediction/fetch PC generation unit 18, which is further coupled to PC silo 48. Alignment unit 16 is further coupled to predictor miss decode unit 26 and decode units 24A–24D. Decode units 24A–24D are further coupled to map unit 30, and decode unit 24D is coupled to microcode unit 28. Map unit 30 is coupled to retire queue 32 (which is coupled to architectural renames file 34), future file 20, scheduler 36, and PC silo 48. Architectural renames file 34 is coupled to future file 20. Scheduler 36 is coupled to register files 38A–38B, which are further coupled to each other and respective execution cores 40A–40B. Execution cores 40A–40B are further coupled to load/store unit 42 and scheduler 36. Execution core 40A is further coupled to D-cache 44. Load/store unit 42 is coupled to scheduler 36, D-cache 44, and external interface unit 46. D-cache 44 is coupled to register files 38. External interface unit 46 is coupled to an external interface 52 and to I-cache 14. Elements referred to herein by a reference numeral followed by a letter will be collectively referred to by the reference numeral alone. For example, decode units 24A–24D will be collectively referred to as decode units 24.

In the embodiment of FIG. 1, processor 10 employs a variable byte length, complex instruction set computing (CISC) instruction set architecture. For example, processor 10 may employ the x86 instruction set architecture (also referred to as IA-32). Other embodiments may employ other instruction set architectures including fixed length instruction set architectures and reduced instruction set computing (RISC) instruction set architectures. Certain features shown in FIG. 1 may be omitted in such architectures.

Branch prediction/fetch PC generation unit 18 is configured to provide a fetch address (fetch PC) to I-cache 14, line predictor 12, and PC silo 48. Branch prediction/fetch PC generation unit 18 may include a suitable branch prediction mechanism used to aid in the generation of fetch addresses. In response to the fetch address, line predictor 12 provides alignment information corresponding to a plurality of instructions to alignment unit 16, and may provide a next fetch address for fetching instructions subsequent to the instructions identified by the provided instruction information. The next fetch address may be provided to branch prediction/fetch PC generation unit 18 or may be directly provided to I-cache 14, as desired. Branch prediction/fetch PC generation unit 18 may receive a trap address from PC silo 48 (if a trap is detected) and the trap address may comprise the fetch PC generated by branch prediction/fetch PC generation unit 18. Otherwise, the fetch PC may be generated using the branch prediction information and information from line predictor 12. Generally, line predictor 12 stores information corresponding to instructions previously speculatively fetched by processor 10. In one embodiment, line predictor 12 includes 2 K entries, each entry locating a group of one or more instructions referred to herein as a "line" of instructions. The line of instructions may be concurrently processed by the instruction processing pipeline of processor 10 through being placed into scheduler 36.

I-cache 14 is a high speed cache memory for storing instruction bytes. According to one embodiment I-cache 14 may comprise, for example, a 128 Kbyte, four way set associative organization employing 64 byte cache lines. However, any I-cache structure may be suitable (including direct-mapped structures).

Alignment unit 16 receives the instruction alignment information from line predictor 12 and instruction bytes corresponding to the fetch address from I-cache 14. Alignment unit 16 selects instruction bytes into each of decode units 24A–24D according to the provided instruction alignment information. More particularly, line predictor 12 provides an instruction pointer corresponding to each decode unit 24A–24D. The instruction pointer locates an instruction within the fetched instruction bytes for conveyance to the corresponding decode unit 24A–24D. In one embodiment, certain instructions may be conveyed to more than one decode unit 24A–24D. Accordingly, in the embodiment shown, a line of instructions from line predictor 12 may include up to 4 instructions, although other embodiments may include more or fewer decode units 24 to provide for more or fewer instructions within a line.

Decode units 24A–24B decode the instructions provided thereto, and each decode unit 24A–24D generates information identifying one or more instruction operations (or ROPs) corresponding to the instructions. In one embodiment, each decode unit 24A–24B may generate up to two instruction operations per instruction. As used herein, an instruction operation (or ROP) is an operation which an execution unit within execution cores 40A–40B is configured to execute as a single entity. Simple instructions may correspond to a single instruction operation, while more complex instructions may correspond to multiple instruction operations. Certain of the more complex instructions may be implemented within microcode unit 28 as microcode routines (fetched from a read-only memory therein via decode unit 24D in the present embodiment). Furthermore, other embodiments may employ a single instruction operation for each instruction (i.e. instruction and instruction operation may be synonymous in such embodiments).

PC silo 48 stores the fetch address and instruction information for each instruction fetch, and is responsible for redirecting instruction fetching upon exceptions (such as instruction traps defined by the instruction set architecture employed by processor 10, branch mispredictions, and other microarchitecturally defined traps). PC silo 48 may include a circular buffer for storing fetch address and instruction information corresponding to multiple lines of instructions which may be outstanding within processor 10. In response to retirement of a line of instructions, PC silo 48 may discard the corresponding entry. In response to an exception, PC silo 48 may provide a trap address to branch prediction/fetch PC generation unit 18. Retirement and exception information may be provided by scheduler 36. In one embodiment, PC silo 48 assigns a sequence number (R#) to each instruction to identify the order of instructions outstanding within processor 10. Scheduler 36 may return R#s to PC silo 48 to identify instruction operations experiencing exceptions or retiring instruction operations.

Upon detecting a miss in line predictor 12, alignment unit 16 routes the corresponding instruction bytes from I-cache 14 to predictor miss decode unit 26. Predictor miss decode unit 26 decodes the instruction, enforcing any limits on a line of instructions as processor 10 is designed for (e.g. maximum number of instruction operations, maximum number of instructions, terminate on branch instructions, etc.). Upon terminating a line, predictor miss decode unit 26 provides the information to line predictor 12 for storage. It is noted that predictor miss decode unit 26 may be configured to dispatch instructions as they are decoded. Alternatively, predictor miss decode unit 26 may decode the line of instruction information and provide it to line predictor 12 for storage. Subsequently, the missing fetch address may be reattempted in line predictor 12 and a hit may be detected.

In addition to decoding instructions upon a miss in line predictor 12, predictor miss decode unit 26 may be configured to decode instructions if the instruction information provided by line predictor 12 is invalid. In one embodiment, processor 10 does not attempt to keep information in line predictor 12 coherent with the instructions within I-cache 14 (e.g. when instructions are replaced or invalidate in I-cache 14, the corresponding instruction information may not actively be invalidated). Decode units 24A–24D may verify the instruction information provided, and may signal predictor miss decode unit 26 when invalid instruction information is detected. According to one particular embodiment, the following instruction operations are supported by processor 10: integer (including arithmetic, logic, shift/rotate, and branch operations), floating point (including multimedia operations), and load/store.

The decoded instruction operations and source and destination register numbers are provided to map unit 30. Map unit 30 is configured to perform register renaming by assigning physical register numbers (PR#s) to each destination register operand and source register operand of each instruction operation. The physical register numbers identify registers within register files 38A–38B. Map unit 30 additionally provides an indication of the dependencies for each instruction operation by providing R#s of the instruction operations which update each physical register number assigned to a source operand of the instruction operation. Map unit 30 updates future file 20 with the physical register numbers assigned to each destination register (and the R# of the corresponding instruction operation) based on the corresponding logical register number. Additionally, map unit 30 stores the logical register numbers of the destination registers, assigned physical register numbers, and the previously assigned physical register numbers in retire queue 32. As instructions are retired (indicated to map unit 30 by scheduler 36), retire queue 32 updates architectural renames file 34 and frees any registers which are no longer in use. Accordingly, the physical register numbers in architectural register file 34 identify the physical registers storing the committed architectural state of processor 10, while future file 20 represents the speculative state of processor 10. In other words, architectural renames file 34 stores a physical register number corresponding to each logical register, representing the committed register state for each logical register. Future file 20 stores a physical register number corresponding to each logical register, representing the speculative register state for each logical register.

The line of instruction operations, source physical register numbers, and destination physical register numbers are stored into scheduler 36 according to the R#s assigned by PC silo 48. Furthermore, dependencies for a particular instruction operation may be noted as dependencies on other instruction operations which are stored in the scheduler. In one embodiment, instruction operations remain in scheduler 36 until retired.

Scheduler 36 stores each instruction operation until the dependencies noted for that instruction operation have been satisfied. In response to scheduling a particular instruction operation for execution, scheduler 36 may determine at which clock cycle that particular instruction operation will update register files 38A–38B. Different execution units within execution cores 40A–40B may employ different numbers of pipeline stages (and hence different latencies). Furthermore, certain instructions may experience more latency within a pipeline than others. Accordingly, a countdown is generated which measures the latency for the particular instruction operation (in numbers of clock cycles).

Scheduler 36 awaits the specified number of clock cycles. (until the update will occur prior to or coincident with the dependent instruction operations reading the register file), and then indicates that instruction operations dependent upon that particular instruction operation may be scheduled. It is noted that scheduler 36 may schedule an instruction once its dependencies have been satisfied (i.e. out of order with respect to its order within the scheduler queue).

Integer and load/store instruction operations read source operands according to the source physical register numbers from register file 38A and are conveyed to execution core 40A for execution. Execution core 40A executes the instruction operation and updates the physical register assigned to the destination within register file 38A. Additionally, execution core 40A reports the R# of the instruction operation and exception information regarding the instruction operation (if any) to scheduler 36. Register file 38B and execution core 40B may operate in a similar fashion with respect to floating point instruction operations (and may provide store data for floating point stores to load/store unit 42).

In one embodiment, execution core 40A may include, for example, two integer units, a branch unit, and two address generation units (with corresponding translation lookaside buffers, or TLBs). Execution core 40B may include a floating point/multimedia multiplier, a floating point/multimedia adder, and a store data unit for delivering store data to load/store unit 42. Other configurations of execution units are possible.

Load/store unit 42 provides an interface to D-cache 44 for performing memory operations and for scheduling fill operations for memory operations which miss D-cache 44. Load memory operations may be completed by execution core 40A performing an address generation and forwarding data to register files 38A–38B (from D-cache 44 or a store queue within load/store unit 42). Store addresses may be presented to D-cache 44 upon generation thereof by execution core 40A (directly via connections between execution core 40A and D-Cache 44). The store addresses are allocated a store queue entry. The store data may be provided concurrently, or may be provided subsequently, according to design choice. Upon retirement of the store instruction, the data is stored into D-cache 44 (although there may be some delay between retirement and update of D-cache 44). Additionally, load/store unit 42 may include a load/store buffer for storing load/store addresses which miss D-cache 44 for subsequent cache fills (via external interface unit 46) and re-attempting the missing load/store operations. Load/store unit 42 is further configured to handle load/store memory dependencies.

D-cache 44 is a high speed cache memory for storing data accessed by processor 10. While D-cache 44 may comprise any suitable structure (including direct mapped and set-associative structures), one embodiment of D-cache 44 may comprise a 128 Kbyte, 2 way set associative cache having 64 byte lines.

External interface unit 46 is configured to communicate to other devices via external interface 52. Any suitable external interface 52 may be used, including interfaces to L2 caches and an external bus or buses for connecting processor 10 to other devices. External interface unit 46 fetches fills for I-cache 16 and D-cache 44, as well as writing discarded updated cache lines from D-cache 44 to the external interface. Furthermore, external interface unit 46 may perform non-cacheable reads and writes generated by processor 10 as well.

Figure 2:
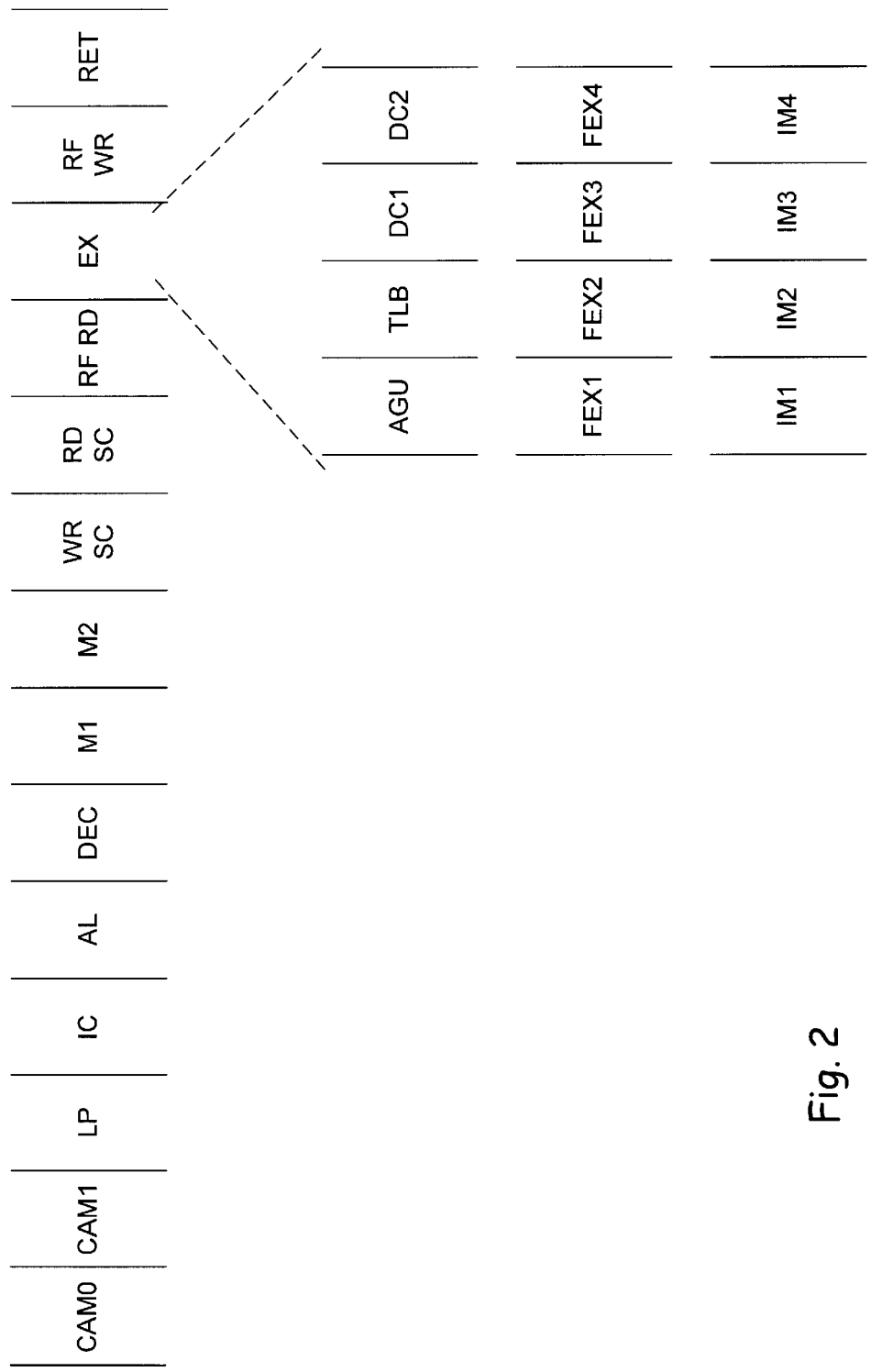
FIG. 2 is a pipeline diagram illustrating an exemplary pipeline which may be employed by one embodiment of the processor shown in FIG. 1.

Turning next to FIG. 2, an exemplary pipeline diagram illustrating an exemplary set of pipeline stages which may be employed by one embodiment of processor 10 is shown. Other embodiments may employ different pipelines, pipelines including more or fewer pipeline stages than the pipeline shown in FIG. 2. The stages shown in FIG. 2 are delimited by vertical dashed lines. Each stage is one clock cycle of a clock signal used to clock storage elements (e.g. registers, latches, flops, and the like) within processor 10.

As illustrated in FIG. 2, the exemplary pipeline includes a CAM0 stage, a CAM1 stage, a line predictor (LP) stage, an instruction cache (IC) stage, an alignment (AL) stage, a decode (DEC) stage, a map1 (M1) stage, a map2 (M2) stage, a write scheduler (WR SC) stage, a read scheduler (RD SC) stage, a register file read (RF RD) stage, an execute (EX) stage, a register file write (RF WR) stage, and a retire (RET) stage. Some instructions utilize multiple clock cycles in the execute state. For example, memory operations, floating point operations, and integer multiply operations are illustrated in exploded form in FIG. 2. Memory operations include an address generation (AGU) stage, a translation (TLB) stage, a data cache 1 (DC1) stage, and a data cache 2 (DC2) stage. Similarly, floating point operations include up to four floating point execute (FEX1–FEX4) stages, and integer multiplies include up to four (IM1–IM4) stages.

During the CAM0 and CAM1 stages, line predictor 12 compares the fetch address provided by branch prediction/fetch PC generation unit 18 to the addresses of lines stored therein. Additionally, the fetch address is translated from a virtual address (e.g. a linear address in the x86 architecture) to a physical address during the CAM0 and CAM1 stages. In response to detecting a hit during the CAM0 and CAM1 stages, the corresponding line information is read from the line predictor during the line predictor stage. Also, I-cache 14 initiates a read (using the physical address) during the line predictor stage. The read completes during the instruction cache stage.

It is noted that, while the pipeline illustrated in FIG. 2 employs two clock cycles to detect a hit in line predictor 12 for a fetch address, other embodiments may employ a single clock cycle (and stage) to perform this operation. Moreover, in one embodiment, line predictor 12 provides a next fetch address for I-cache 14 and a next entry in line predictor 12 for a hit, and therefore the CAM0 and CAM1 stages may be skipped for fetches resulting from a previous hit in line predictor 12.

Instruction bytes provided by I-cache 14 are aligned to decode units 24A–24D by alignment unit 16 during the alignment stage in response to the corresponding line information from line predictor 12. Decode units 24A–24D decode the provided instructions, identifying ROPs corresponding to the instructions as well as operand information during the decode stage. Map unit 30 generates ROPs from the provided information during the map1 stage, and performs register renaming (updating future file 20). During the map2 stage, the ROPs and assigned renames are recorded in retire queue 32. Furthermore, the ROPs upon which each ROP is dependent are determined. Each ROP may be register dependent upon earlier ROPs as recorded in the future file, and may also exhibit other types of dependencies (e.g. dependencies on a previous serializing instruction, etc.)

The generated ROPs are written into scheduler 36 during the write scheduler stage. Up until this stage, the ROPs located by a particular line of information flow through the pipeline as a unit. However, subsequent to be written into scheduler 36, the ROPs may flow independently through the remaining stages, at different times Generally, a particular ROP remains at this stage until selected for execution by scheduler 36 (e.g. after the ROPs upon which the particular ROP is dependent have been selected for execution, as described above). Accordingly, a particular ROP may experience one or more clock cycles of delay between the write scheduler stage and the read scheduler stage. During the read scheduler stage, the particular ROP participaties in the selection logic within scheduler 36, is selected for execution, and is read from scheduler 36. The particular ROP then proceeds to read register file operations from one of register files 38A–38B (depending upon the type of ROP) in the register file read stage.

The particular ROP and operands are provided to the corresponding execution core 40A or 40B, and the instruction operation is performed on the operands during the execution stage. As mentioned above, some ROPs have several pipeline stages of 20 execution. For example, memory instruction operations (e.g. loads and stores) are executed through an address generation stage (in which the data address of the memory location accessed by the memory instruction operation is generated), a translation stage (in which the virtual data address provided by the address generation stage is translated) and a pair of data cache stages in which D-cache 44 is accessed. Floating point operations may employ up to 4 clock cycles of execution, and integer multiplies may similarly employ up to 4 clock cycles of execution.

Upon completing the execution stage or stages, the particular ROP updates its assigned physical register during the register file write stage. Finally, the particular ROP is retired after each previous ROP is retired (in the retire stage). Again, one or more clock cycles may elapse for a particular ROP between the register file write stage and the retire stage. Furthermore, a particular ROP may be stalled at any stage due to pipeline stall conditions, as is well known in the art.

Misalignment Handling

Figure 3:
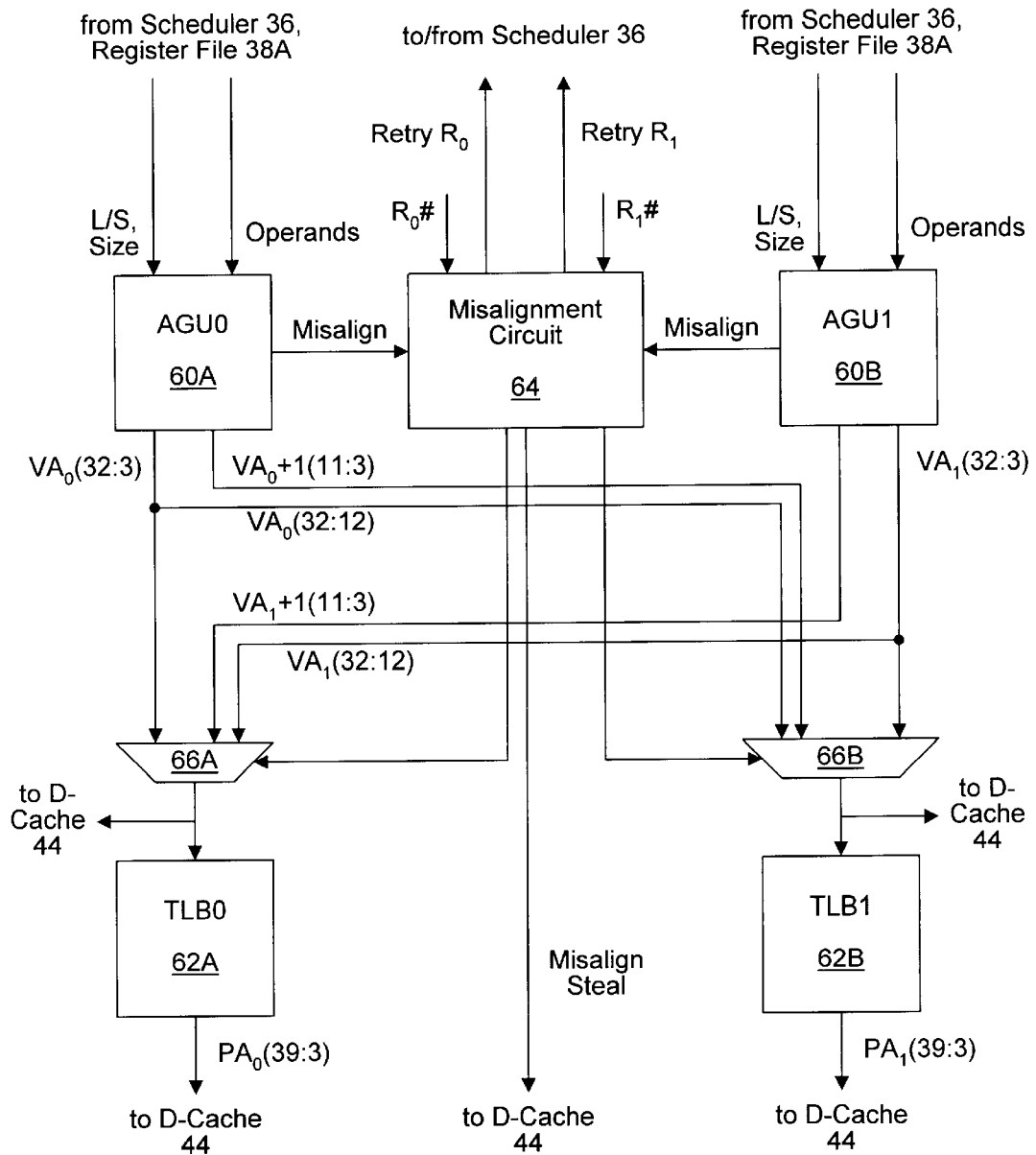
FIG. 3 is a block diagram of one embodiment of a portion of the processor shown in FIG. 1 used for generating addresses of memory operations and handling misalignment cases.

Turning now to FIG. 3, a block diagram of one embodiment of a portion of the processor shown in FIG. 1 is shown. Other embodiments are possible and contemplated.

In the embodiment of FIG. 3, a pair of address generation units (AGUs) AGU0 60A and AGU1 60B, a pair of translation lookaside buffers (TLBs) TLB0 62A and TLB1 62B, a misalignment circuit 64, and a pair of multiplexors (muxes) 66A and 66B are included.

AGUs 60A–60B are each coupled to receive a memory operation for execution from scheduler 36, and to receive the corresponding operands from register file 38A. AGUs 60A–60B are each coupled to provide a misalign signal to misalignment circuit 64, and are coupled to provide virtual address information to muxes 66A–66B. Misalignment circuit 64 is coupled to receive, from scheduler 36, R#s corresponding to the memory operations received by AGUs 60A–60B ($R_0$# corresponding to the memory operation received by AGU0 60A and $R_1$# corresponding to the memory operation received by AGU1 60B). Misalignment circuit 64 is coupled to provide a retry signal corresponding to each memory operation to scheduler 36, and a misalign steal signal to D-cache 44. Additionally, misalignment circuit 64 is coupled to provide selection controls to muxes 66A–66B. The output of mux 66A is routed to a first port on D-cache 44 and to TLB 62A. Similarly, the output of mux 66B is routed to a second port on D-cache 44 and to TLB 62B. Each of TLBs 62A–62B is coupled to provide a physical address to D-cache 44. AGUs 60A–60B, misalignment circuit 64, muxes 66A–66B, and TLBs 62A–62B may be included in integer execution core 40A shown in FIG. 1, according to one embodiment.

Generally, AGU0 60A is coupled to receive and execute a first memory operation and AGU1 60B is coupled to concurrently receive and execute a second memory operation. The following discussion refers to the operation of AGU0 60A. AGU1 60B may operate in a similar fashion. AGU0 60A receives an indication of the load/store nature of the first memory operation and the size (i.e. number of bytes) operated upon by the first memory operation from scheduler 36. AGU0 60A receives the operands of the first memory operation from register file 38A and adds the operands to produce the virtual address ($VA_0$). Additionally, AGU0 60A generates a portion of an incremented virtual address ($VA_0$+1) to handle the misaligned cases. The incremented virtual address identifies the bytes on the other side of the misalignment boundary. AGU0 60A provides the virtual address to mux 66A, and the portion of the incremented virtual address to mux 66B (along with a remaining portion of the virtual address $VA_0$, to provide a complete virtual address). Similarly, AGU1 60B provides the virtual address ($VA_1$) to mux 66B, and the incremented virtual address ($VA_1$+1) to mux 66A (along with the remaining portion of the virtual address $VA_1$).

AGU0 60A determines if the first memory operation is misaligned, and generates a misalign signal to misalignment circuit 64. Various embodiments may define misalignment in different fashions. In the embodiment of FIG. 3, a memory operation is misaligned if it crosses an eight byte (quadword) boundary. The embodiment of FIG. 3 may be used, for example, with an embodiment of D-cache 44 which is banked in eight byte banks. Thus, each port of D-cache 44 may access one bank having a quadword of data. If all the data operated upon by: the memory operation is within the bank, then the memory operation is considered aligned by AGU0 60A and AGU0 60A deasserts the misalign signal. On the other hand, if the data is spread across two banks, the memory operation is considered misaligned by AGU0 60A and AGU0 60A asserts the misalign signal. Additionally, the incremented virtual address in this case is the virtual address incremented by one quadword.

Misalignment circuit 64 receives the misalign signals from both AGUs 60A–60B and controls muxes 66A–66B accordingly. More particularly, if either of the misalign signals are asserted, misalignment circuit 64 may determine which of the memory operations is older in program order and may retry the other (younger) memory operation. By retrying the younger memory operation, the execution resources provided for the younger memory operation become available for use by the older memory operation. Misalignment circuit 64 may control muxes 66A–66B to allocate the execution resources of the younger memory operation to the older memory operation.

For example, if the first memory operation executed by AGU0 60A is misaligned and is older than the second memory operation concurrently executed by AGU1 60B, misalignment circuit 64 may retry the second memory operation. Accordingly, the port of D-cache 44 coupled to receive the output of mux 66B is not used for the second memory operation. Therefore, misalignment circuit 64 selects the incremented virtual address provided by AGU0 60A through mux 66B. The second port of D-cache 44 may thus be used by the first memory operation to retrieve the data on the other side of the quadword boundary across which the first memory operation is misaligned. In this manner, the first memory operation may be allocated the execution resources normally allocated for the memory operations executed by AGU1 60B. Misalignment circuit 64 provides select control signals to both muxes 66A–66B, to allow for execution resources to be allocated to either memory operation (executed in either AGU 60A–60B).

The execution resources allocated to each memory operation, in the embodiment of FIG. 3, are a port of D-cache 44 and a TLB 62A–62B. Each port of D-cache 44 may provide access to one bank of one cache line in D-cache 44. Additionally, each TLB 62A–62B may translate one virtual address to a corresponding physical address (which is then provided to D-cache 44 for tag comparison to determine if a hit occurs in D-cache 44). Generally, each TLB 62A–62B is a cache of virtual to physical address translations. The most recently used translations are stored. If a TLB miss is detected, the corresponding translation may be read from software-managed tables in main memory.

If the older memory operation is a misaligned load memory operation, misalignment circuit 64 asserts the misalign steal signal to D-cache 44. D-cache 44 may thus be informed that a misaligned load is using both ports of D-cache 44 to access each of the misaligned portions of the data. D-cache 44 may merge the data read from each port to provide the complete memory operand for forwarding as a single result in response to an assertion of the misalign steal signal. If the misalign steal signal is not asserted, D-cache 44 forwards data from the two ports separately. It is noted that D-cache 44 may also receive an indication of which bytes are used from each port (e.g. byte enables for each byte within the quadword) to determine which bytes to merge for forwarding.

By allocating the execution resources of the other memory operation to the misaligned memory operation, misaligned memory operations may be completed using the same execution resources provided to perform multiple memory operations concurrently. While the memory operation bandwidth may be reduced for that execution cycle, little additional hardware may be used (e.g. misalignment circuit 64 and circuitry in D-cache 44 to merge the data from the two ports for a misaligned load). Additionally, the power expended during execution of a misaligned memory operation may be approximately the same as executing two memory operations, since the execution resources used for the other memory operation are used to perform the second access of the misaligned memory operation.

Misalignment circuit 64 determines which of the memory operations is older using an indication of the relative program order of the memory operations. In the present embodiment, for example, misalignment circuit 64 receives the R#s corresponding to the memory operations. The relative program order of the two memory operations (i.e. which is first in program order) may be determined by comparing the two R#s. Misalignment circuit 64 may signal scheduler 36 that one of the memory operations is being retried by asserting the corresponding retry signal (Retry $R_0$ for the memory operation in AGU0 60A and Retry $R_1$ for the memory operation in AGU1 60B). Alternatively, misalignment circuit 64 may return the R# of the memory operation being retried to scheduler 36. Generally, an instruction operation is referred to as retried if its execution is cancelled and the instruction operation is returned to a "not executed" state in scheduler 36. Subsequently, scheduler 36 may reschedule the memory operation for execution.

It is noted that, if a misalignment is signalled by one of AGUs 60A–60B, the misaligned memory operation may be the younger of the two memory operations (and thus may be the memory operation which is retried). In this case, the execution resources for the younger memory operation are idle. Subsequently, the misaligned memory operation may be rescheduled and may be the older memory operation, at which point the misaligned memory operation may be completed. It is further noted that, if only one memory operation is being executed and is misaligned, then no memory operations need be retried to allow the misaligned memory operation to complete. Misalignment circuit 64 may not assert a retry signal in this case, but otherwise may operate as described above.

Finally, if no misalignment is signalled by AGUs 60A–60B, misalignment circuit 64 may control mux 66A to select the virtual address from AGU0 60A ($VA_0$) and may control mux 66B to select the virtual address from AGU1 60B ($VA_1$). Thus, each memory operation may use its allocated execution resources, and two memory operations may be completed.

It is noted that the incremented virtual address provided in the present embodiment includes the page offset portion of the virtual address (i.e. the bits of the virtual address which are not translated by TLBs 62A–62B). Thus, the incremented virtual address concatenated with the page portion of the virtual address may represent the bytes on the other side of the misalignment boundary (e.g. quadword boundary) as long as the misaligned memory operation does not also cross a page boundary. In the embodiment of FIG. 3, misaligned memory operations which cross a page boundary are executed non-speculatively, to ensure that both pages translate properly. Other embodiments may handle more or fewer misalignment cases by retrying and allocating execution resources from the retried memory operation to the misaligned memory operation. For example, an embodiment is contemplated in which misalignments that cross a quadword boundary but not a cache line boundary are handled. Such an embodiment may provide $Va_x+1[5:3]$ instead of $VA_x+1[11:3]$. Furthermore, other embodiments may define misalignment at different boundaries. For example, doubleword of octword boundaries might be used, as well as any other suitable size. Doubleword or octword boundaries may be used in embodiments in which cache banks are doubleword or octword in size, respectively, for example.

While the present embodiment provides separate TLBs 62A–62B for use by each concurrently executable memory operation, other embodiments may employ a single TLB having multiple ports. In such an embodiment, the match lines within the TLB (which select an output physical address of a TLB entry having a virtual address matching the input virtual address) may be muxed instead of the addresses input to the TLB. Since the match lines for each port may be physically adjacent each other within the TLB, the muxing may be efficiently performed therein. Muxes may still be provided external to the TLB, for selecting the cache index portion of the virtual addresses (e.g. bits [11:3] in the present embodiment).

It is noted that, in one embodiment, execution resource reallocation may be performed only for misaligned loads. In such an embodiment, AGUs 60A–60B may assert the misalign signal only for loads which are misaligned, and may deassert the misalign signal for stores even if the stores are misaligned. Stores may be transmitted to a store queue within load/store unit 42, from which the stores update D-cache 44 after being retired. Accordingly, the non-incremented and incremented virtual addresses may be provided to the store queue for storage. The store queue may detect that the store is misaligned and may perform two accesses to D-cache 44 to commit the store data. In one particular embodiment, AGU0 60A may be used only for loads, while AGU1 60B may be used for loads or stores (and thus AGU1 60B may be coupled to the store queue and AGU0 60A may not be coupled to the store queue).

It is noted that, in the present embodiment, 32 bit virtual addresses are shown. However, embodiments are contemplated in which the virtual addresses are 64 bit (or any suitable number of bits as may be defined in a 64 bit instruction set architecture). Similarly, the physical addresses may be any number of bits and may be defined in a 64 bit instruction set architecture. For example, 40–48 bits may be suitable, as well as any another number up to and including 64 bits.

In the above described embodiment, misalignment circuit 64 receives an indication of the relative program order of the memory operations to determine which memory operation is younger (to be retried). In another embodiment, scheduler 36 may schedule the older memory operation to AGU0 60A when multiple memory operations are concurrently scheduled. Accordingly, the memory operation in AGU0 60A may be older in each case. Mux 66A may be eliminated in such an embodiment, and misalignment circuit 64 may retry the memory operation in AGU1 60B if misalignment is detected in either AGU 60A–60B. Such an embodiment of misalignment circuit 64 may not receive the R#s corresponding to the memory operations unless the R# of the memory operation is returned to scheduler 36 to retry the memory operation, in which case the $R_1$# may still be received.

It is noted that, while two AGUs are shown in FIG. 3, other embodiments may employ more than two AGUs, as desired. Corresponding execution resources (e.g. D-cache ports) may be provided for each AGU.

Figure 4:
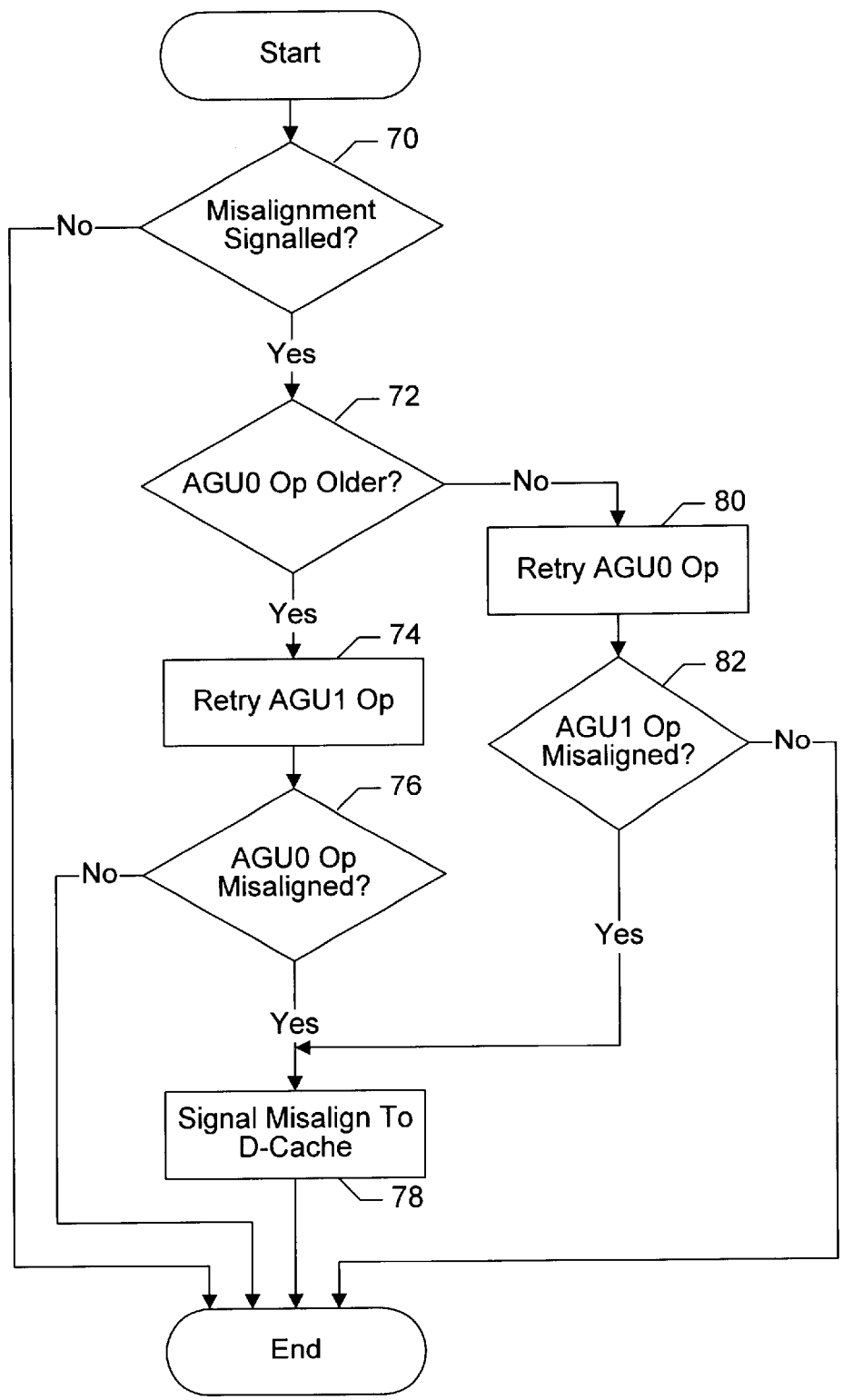
FIG. 4 is a flowchart illustrating operation of one embodiment of a misalignment circuit shown in FIG. 3.

Turning now to FIG. 4, a flowchart is shown illustrating operation of one embodiment of misalignment circuit 64. Other embodiments are possible and contemplated. Although the steps shown in FIG. 4 are illustrated in a particular order for ease of understanding, any suitable order may be used. Furthermore, steps may be performed in parallel in combinatorial logic within misalignment circuit 64.

Misalignment circuit 64 determines if a misalignment is signalled (decision block 70) via the misalign signals provided by the AGUs. If misalignment is not signalled, misalignment circuit 64 may be idle until the next memory operations are executed. If misalignment is signalled, misalignment circuit 64 determines if AGU0 60A is executing the older memory operation (decision block 72). If AGU0 60A is executing the older memory operation, misalignment circuit 64 may retry the memory operation being executed by AGU1 60B (step 74). Additionally, if AGU0 60A is executing a misaligned load (decision block 76), misalignment circuit 64 may assert the misalign steal signal to D-cache 44 (step 78).

On the other hand, if misalignment is signalled and AGU0 60A is executing the younger memory operation, misalignment circuit 64 retries the memory operation in AGU0 60A (step 80). As mentioned above, if only one memory operation is being executed, misalignment circuit 64 may not assert a retry. Additionally, if AGU1 60B is executing a misaligned load (decision block 82), misalignment circuit 64 may assert the misalign steal signal to D-cache 44 (step 78).

Computer Systems

Figure 5:
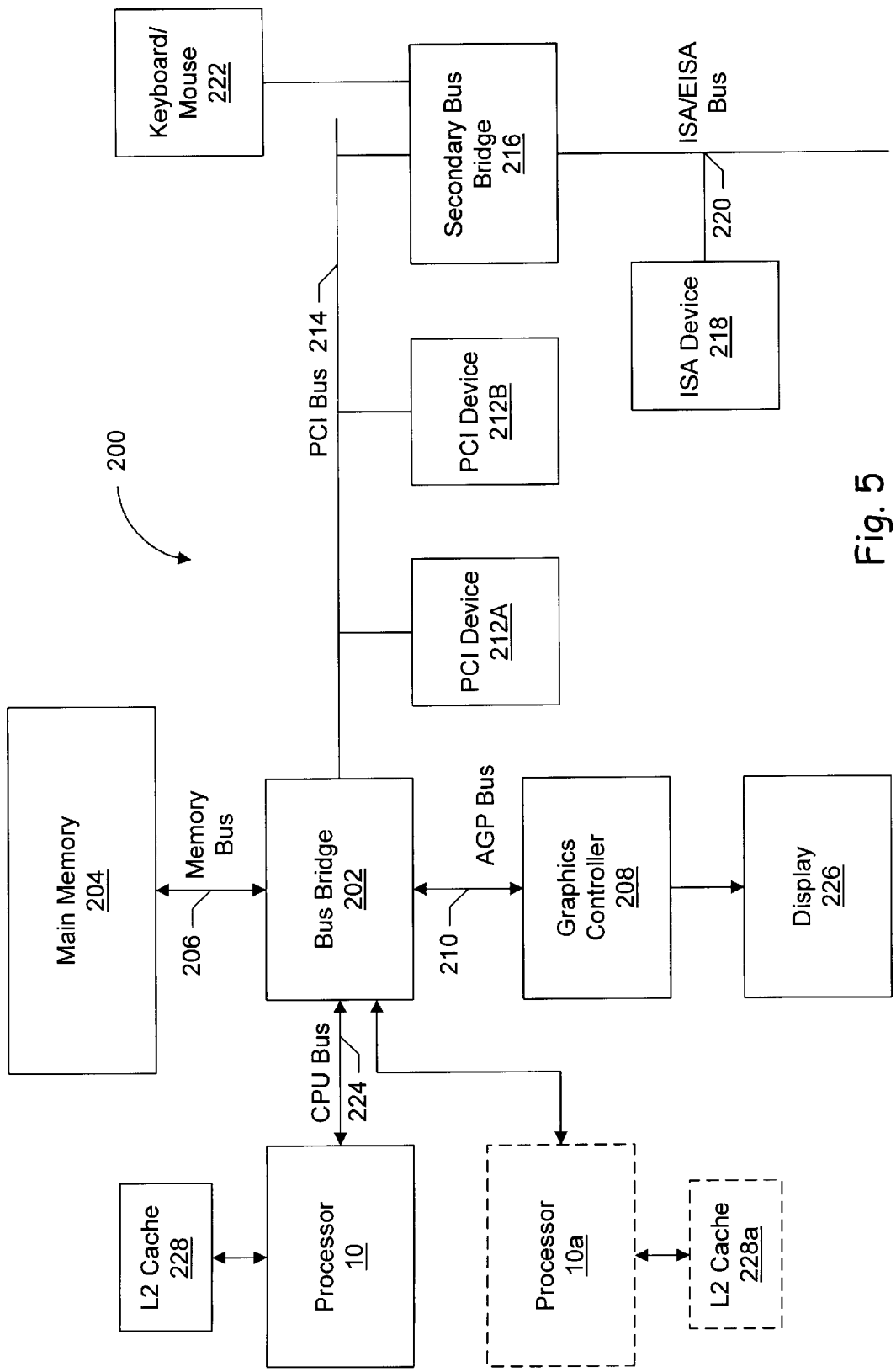
FIG. 5 is a block diagram of a computer system including the processor shown in FIG. 1.

Turning now to FIG. 5, a block diagram of one embodiment of a computer system 200 including processor 10 coupled to a variety of system components through a bus bridge 202 is shown. Other embodiments are possible and contemplated. In the depicted system, a main memory 204 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 220. Processor 10 is coupled to bus bridge 202 through a CPU bus 224 and to an optional L2 cache 228. Together, CPU bus 224 and the interface to L2 cache 228 may comprise external interface 52.

Bus bridge. 202 provides an interface between processor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to CPU bus 224 between processor 10 and bus bridge 202 in other embodiments. Alternatively, the external cache may be coupled to bus bridge 202 and cache control logic for the external cache may be integrated into bus bridge 202. L2 cache 228 is further shown in a backside configuration to processor 10. It is noted that L2 cache 228 may be separate from processor 10, integrated into a cartridge (e.g. slot 1 or slot A) with processor 10, or even integrated onto a semiconductor substrate with processor 10.

Main memory 204 is a memory in which application programs are stored and from which processor 10 primarily executes. A suitable main memory 204 comprises DRAM (Dynamic Random Access Memory). For example, a plurality of banks of SDRAM (Synchronous DRAM) or Rambus DRAM (RDRAM) may be suitable.

PCI devices 212A–212B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 200 may be a multiprocessing computer system including additional processors (e.g. processor 10*a* shown as an optional component of computer system 200). Processor 10*a* may be similar to processor 10. More particularly, processor 10*a* may be an identical copy of processor 10. Processor 10*a* may be connected to bus bridge 202 via an independent bus (as shown in FIG. 5) or may share CPU bus 224 with processor 10. Furthermore, processor 10*a* may be coupled to an optional L2 cache 228*a* similar to L2 cache 228.

Figure 6:
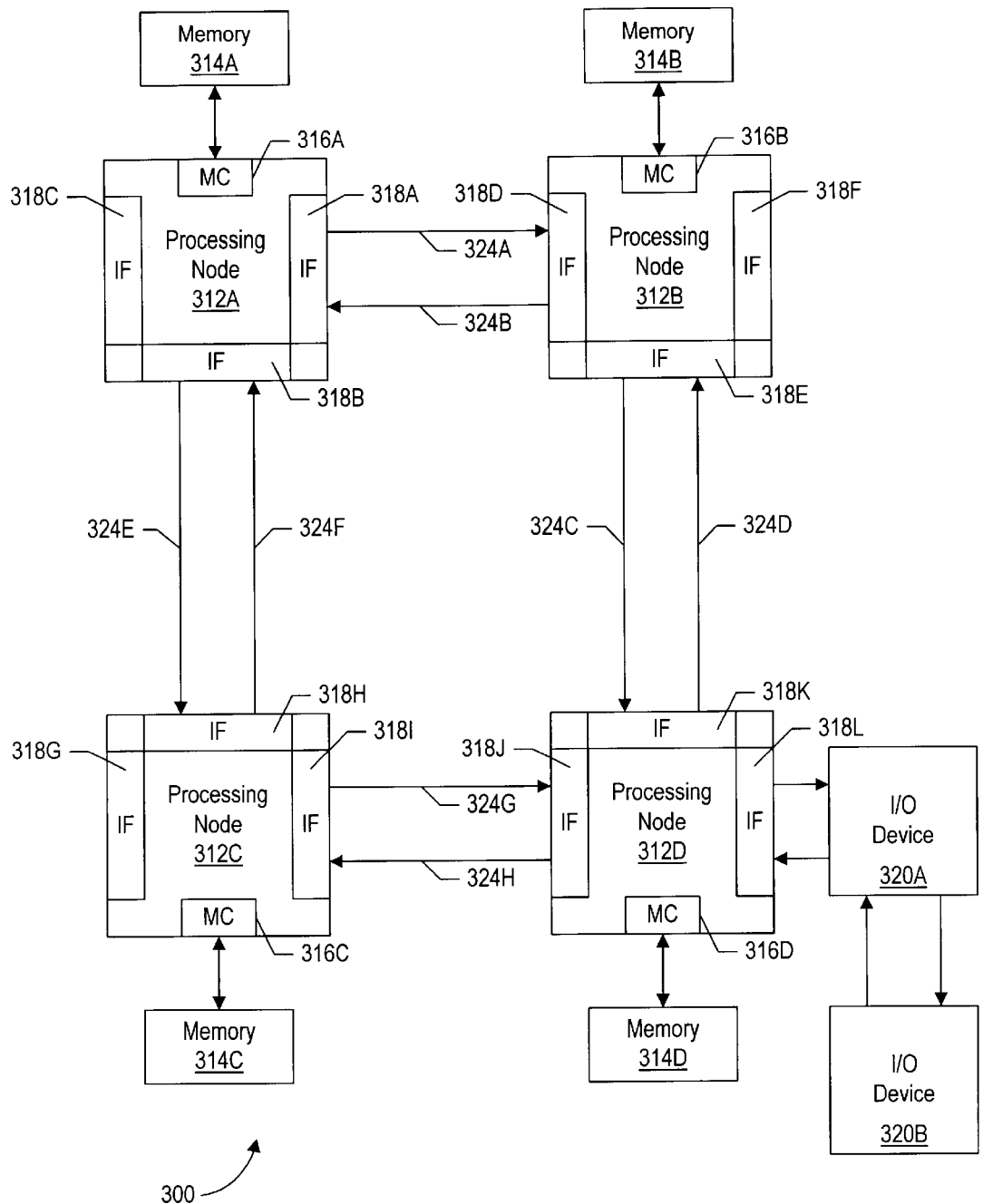
FIG. 6 is a block diagram of another embodiment of a computer system including the processor shown in FIG. 1.

Turning now to FIG. 6, another embodiment of a computer system 300 is shown. Other embodiments are possible and contemplated. In the embodiment of FIG. 6, computer system 300 includes several processing nodes 312A, 312B, 312C, and 312D. Each processing node is coupled to a respective memory 314A–314D via a memory controller 316A–316D included withineach respective processing node 312A–312D. Additionally, processing nodes 312A–312D include interface logic used to communicate between the processing nodes 312A–312D. For example, processing node 312A includes interface logic 318A for communicating with processing node 312B, interface logic 318B for communicating with processing node 312C, and a third interface logic 318C for communicating with yet another processing node (not shown). Similarly, processing node 312B includes interfacelogic 318D, 318E, and 318F; processing node 312C includes interface logic 318G, 318H, and 318I; and processing node 312D includes interface logic 318J, 318K, and 318L. Processing node 312D is coupled to communicate with a plurality of input/output devices (e.g. devices 320A–320B in a daisy chain configuration) via interface logic 318L. Other processing nodes may communicate with other I/O devices in a similar fashion.

Processing nodes 312A–312D implement a packet-based link for inter-processing node communication. In the present embodiment, the link is implemented as sets of unidirectional lines (e.g. lines 324A are used to transmit packets from processing node 312A to processing node 312B and lines 324B are used to transmit packets from processing node 312B to processing node 312A). Other sets of lines 324C–324H are used to transmit packets between other processing nodes as illustrated in FIG. 6. Generally, each set of lines 324 may include one or more data lines, one or more clock lines corresponding to the data lines, and one or more control lines indicating the type of packet being conveyed. The link may be operated in a cache coherent fashion for communication between processing nodes or in a noncoherent fashion for communication between a processing node and an I/O device (or a bus bridge to an I/O bus of conventional construction such as the PCI bus or ISA bus). Furthermore, the link may be operated in a non-coherent fashion using a daisy-chain structure between I/O devices as shown. It is noted that a packet to be transmitted from one processing node to another may pass through one or more intermediate nodes. For example, a packet transmitted by processing node 312A to processing node 312D may pass through either processing node 312B or processing node 312C as shown in FIG. 6. Any suitable routing algorithm may be used. Other embodiments of computer system 300 may include more or fewer processing nodes then the embodiment shown in FIG. 6.

Generally, the packets may be transmitted as one or more bit times on the lines 324 between nodes. A bit time may be the rising or falling edge of the clock signal on the corresponding clock lines. The packets may include command packets for initiating transactions, probe packets for maintaining cache coherency, and response packets from responding to probes and commands.

Processing nodes 312A–312D, in addition to a memory controller and interface logic, may include one or more processors. Broadly speaking, a processing node comprises at least one processor and may optionally include a memory controller for communicating with a memory and other logic as desired. More particularly, a processing node 312A–312D may comprise processor 10. External interface unit 46 may includes the interface logic 318 within the node, as well as the memory controller 316.

Memories 314A–314D may comprise any suitable memory devices. For example, a memory 314A–314D may comprise one or more RAMBUS DRAMs (RDRAMs), synchronous DRAMs (SDRAMs), static RAM, etc. The address space of computer system 300 is divided among memories 314A–314D. Each processing node 312A–312D may include a memory map used to determine which addresses are mapped to which memories 314A–314D, and hence to which processing node 312A–312D a memory request for a particular address should be routed. In one embodiment, the coherency point for an address within computer system 300 is the memory controller 316A–316D coupled to the memory storing bytes corresponding to the address. In other words, the memory controller 316A–316D is responsible for ensuring that each memory access to the corresponding memory 314A–314D occurs in a cache coherent fashion. Memory controllers 316A–316D may comprise control circuitry for interfacing to memories 314A–314D. Additionally, memory controllers 316A–316D may include request queues for queuing memory requests.

Generally, interface logic 318A–318L may comprise a variety of buffers for receiving packets from the link and for buffering packets to be transmitted upon the link. Computer system 300 may employ any suitable flow control mechanism for transmitting packets. For example, in one embodiment, each interface logic 318 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 320A–320B may be any suitable I/O devices. For example, I/O devices 320A–320B may include network interface cards, video accelerators, audio cards, hard or floppy disk drives or drive controllers, SCSI (Small Computer Systems Interface) adapters and telephony cards, modems, sound cards, and a variety of data acquisition cards such as GPIB or field bus interface cards.

Numerous variations and modifications will become apparent to those skilled in the art once the above disclosure is fully appreciated. It is intended that the following claims be interpreted to embrace all such variations and modifications.

What is claimed is:

1. A processor comprising:
   a first address generation unit (AGU) configured to generate a first misalign signal indicative of whether or not a first memory operation is misaligned, wherein said first AGU is configured to detect misalignment if the first memory operation is a load but not if the first memory operation is a store, even if the store is misaligned; and a misalignment circuit coupled to receive said first misalign signal, wherein said misalignment circuit is configured to allocate at least one execution resource corresponding to a second memory operation concurrently executable with said first memory operation to said first memory operation in response to said first misalign signal.

2. The processor as recited in claim 1 further comprising a second AGU configured to generate a second misalign signal indicative of whether or not said second memory operation is misaligned, and wherein said misalignment circuit is coupled to receive said second misalign signal.

3. The processor as recited in claim 2 wherein said misalignment circuit is configured to signal a retry of a younger one of said first memory operation and said second memory operation responsive to at least one of said first misalign signal and said second misalign signal indicating misaligned.

4. The processor as recited in claim 3 wherein said misalignment circuit is further coupled to receive an indication of a relative program order of said first memory operation and said second memory operation, and wherein said misalignment circuit is configured to signal said retry of said younger one further responsive to said indication.

5. The processor as recited in claim 4 wherein said indication comprises a first instruction operation number assigned to said first memory operation and a second instruction operation number assigned to said second memory operation, and wherein said misalignment circuit is configured to determine said relative program order by comparing said first instruction operation number to said second instruction operation number.

6. The processor as recited in claim 4 wherein said misalignment circuit is configured to allocate said at least one execution resource further responsive to said first memory operation being older than said second memory operation as indicated by said indication of relative program order.

7. The processor as recited in claim 2 wherein said first AGU is further configured to generate a first address corresponding to said first memory operation, and wherein said second AGU is further configured to generate a second address corresponding to said second memory operation.

8. The processor as recited in claim 1 further comprising a data cache coupled to said first AGU, and wherein said at least one execution resource includes a port on said data cache.

9. The processor as recited in claim 8 further comprising a translation lookaside buffer (TLB) coupled to said first AGU, and wherein said at least one execution resource includes said TLB.

10. A method comprising:
executing a first memory operation, said executing including determining that said first memory operation is misaligned if said first memory operation is a load but not if said first memory operation is a store, even if said store is misaligned; and
allocating at least one execution resource corresponding to a second memory operation concurrently executable with said first memory operation to said first memory operation responsive to said determining.

11. The method as recited in claim 10 further comprising executing said second memory operation concurrent with said executing said first memory operation.

12. The method as recited in claim 11 further comprising retrying a younger one of said first memory operation and said second memory operation in response to a relative program order of said first memory operation and said second memory operation.

13. The method as recited in claim 12 wherein said allocating is further responsive to said first memory operation being older than said second memory operation.

14. A processor comprising:
a first address generation unit (AGU) configured to generate a first misalign signal indicative of whether or not a first memory operation is misaligned;
a second AGU configured to generate a second misalign signal indicative of whether or not a second memory operation is misaligned; and
a misalignment circuit coupled to receive said first misalign signal and said second misalign signal, wherein said misalignment circuit is configured to signal a retry of one of said first memory operation and said second memory operation in response to at least one of said first misalign signal and said second misalign signal indicating misaligned, wherein a retried memory operation is subsequently rescheduled and reexecuted in an AGU, and wherein reexecuting the retried memory operation includes regenerating an address of the retried memory operation.

15. The processor as recited in claim 14 wherein said first AGU is further configured to generate a first address corresponding to said first memory operation, and wherein said second AGU is configured to generate a second address corresponding to said second memory operation.

16. The processor as recited in claim 14 wherein said misalignment circuit is configured to signal said retry for a younger one of said first memory operation and said second memory operation.

17. The processor as recited in claim 16 wherein said misalignment circuit is further coupled to receive an indication of relative program order of said first memory operation and said second memory operation, and wherein said misalignment circuit is configured to determine said younger one responsive to said indication of relative program order.

18. The processor as recited in claim 14 further comprising a scheduler, wherein said scheduler is coupled to receive an indication of said retry by said misalignment circuit, and wherein said scheduler is configured to reschedule said one of said first memory operation and said second memory operation responsive to said indication.

19. The processor as recited in claim 14 wherein, if said misalignment circuit retries said second memory operation and said first memory operation is misaligned, said misalignment circuit is configured to allocate at least one execution resource corresponding to said second memory operation to said first memory operation.

20. The processor as recited in claim 24 further comprising a data cache coupled to said first AGU, and wherein said at least one execution resource includes a port on said data cache.

21. The processor as recited in claim 24 further comprising a translation lookaside buffer (TLB) coupled to said first AGU, and wherein said at least one execution resource includes said TLB.

22. A computer system comprising:
a processor comprising:
a first address generation unit (AGU) configured to generate a first misalign signal indicative of whether or not a first memory operation is misaligned, wherein said first AGU is configured to detect misalignment if the first memory operation is a load but not if the first memory operation is a store, even if the store is misaligned; and a misalignment circuit coupled to receive said first misalign signal, wherein said misalignment circuit is configured to allocate at least one execution resource corresponding to a second memory operation concurrently executable with said first memory operation to said first memory operation in response to said first misalign signal; and an input/output (I/O) device configured to communicate between said computer system and another computer system to which said I/O device is couplable.

23. The computer system as recited in claim 22 wherein said I/O device is a modem.

24. The computer system as recited in claim 22 further comprising an audio I/O device.

25. The computer system as recited in claim 24 wherein said audio I/O device comprises a sound card.

26. The computer system as recited in claim 22 further comprising a second processor, said second processor including:

a first address generation unit (AGU) configured to generate a first misalign signal indicative of whether or not a first memory operation is misaligned;

a second AGU configured to generate a second misalign signal indicative of whether or not a second memory operation is misaligned; and a misalignment circuit coupled to receive said first misalign signal and said second misalign signal, wherein said misalignment circuit is configured to signal a retry of one of said first memory operation and said second memory operation response to at least one of said first misalign signal and said second misalign signal indicating misaligned.

27. A method comprising:

detecting whether or not a first memory operation is misaligned and whether or not a second memory operation is misaligned;

retrying one of the first memory operation and the second memory operation responsive to detecting that at least one of the first memory operation and the second memory operation is misaligned;

rescheduling the one of the first memory operation and the second memory operation in response to the retrying; and reexecuting the one of the first memory operation and the second memory operation in response to the rescheduling, the reexecuting comprising regenerating an address of the one of the first memory operation and the second memory operation.

28. The method as recited in claim 27 wherein the retrying comprises retrying a younger one of the first memory operation and the second memory operation.

29. The method as recited in claim 27 further comprising, if the second memory operation is retried and the first memory operation is misaligned, allocating at least one execution resource corresponding to the second memory operation to the first memory operation.

30. The method as recited in claim 29 wherein said at least one execution resource includes a port on a data cache.

31. The method as recited in claim 29 wherein said at least one execution resource includes a translation lookaside buffer.

* * * * *

UNITED STATES PATENT AND TRADEMARK OFFICE
CERTIFICATE OF CORRECTION

PATENT NO. : 6,704,854 B1
DATED : March 9, 2004
INVENTOR(S) : Stephan G. Meier and James B. Keller It is certified that error appears in the above-identified patent and that said Letters Patent is hereby corrected as shown below:

<u>Column 18,</u>
Line 51, please delete "24" and insert -- 19 -- in place thereof.
Line 55, please delete "24" and insert -- 19 -- in place thereof.

Signed and Sealed this

Twenty-fifth Day of May, 2004

JON W. DUDAS
*Acting Director of the United States Patent and Trademark Office*